May 15, 1934.　　　C. KRAUSEN　　　1,958,827

WREATH HOOP WIRE

Filed Oct. 27, 1932

Inventor:
Carl Krausen
By Knight Bros.
His attys.

Patented May 15, 1934

1,958,827

UNITED STATES PATENT OFFICE 1,958,827

WREATH HOOP WIRE

Carl Krausen, Aachen, Germany

Application October 27, 1932, Serial No. 639,885
In Germany November 2, 1931

3 Claims. (Cl. 41—12)

For making wreaths, a wire of round or square section is usually employed as an insert which is bent to form a hoop, to which the flowers or bunches of leaves are attached by means of binding wire. The making of wreaths on such hoop wire is relatively tedious and takes a considerable time, as the bunches of flowers or leaves united to form a wreath are difficult to bring into the necessary mutual position when binding on the smooth wire hoop. Moreover the bunches of flowers and leaves do not sit very securely on the wire hoop so that it often happens that they shift. This objection is overcome by the invention.

The invention consists in that the wreath hoop wire has lateral projections which prevent the bunches of flowers and leaves from slipping and shifting on the wire hoop bent from the wreath hoop wire. The projections of the wreath hoop wire according to the invention may be made in the shape of projecting ribs which extend along the entire length of the wire or may be arranged in separate pieces at distances apart, or may have the shape of pins or the like, projecting from the wire core at suitable distances apart.

Owing to the special construction of the new wreath hoop wire the bunches of flowers or leaves united to form a wreath have a secure hold on the wreath hoop constructed of such wire because the projections penetrate between the stalks when being fixed on the wreath and thus reliably prevent a slipping or shifting of bunches of flowers or leaves on the wreath hoop. Consequently, the binding of wreaths is considerably facilitated by means of the new wreath hoop wire and the wreaths formed in this manner retain the shape imparted thereto during the making.

Two embodiments of the invention are illustrated by way of example in the accompanying drawing in which:—

Figure 1:
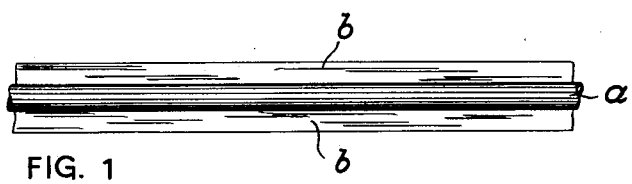
Fig. 1 shows a length of wire in side elevation.
Figure 2:
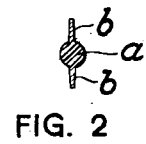
Fig. 2 is a cross section of Fig. 1.

In the form of construction illustrated in Figs. 1 and 2 the wreath hoop wire consists of a wire core $a$ of circular cross section and two thin ribs $b$ projecting from opposite sides of the core $a$ extending along the entire length of the wire and tapering towards their outer edges.

Figure 3:
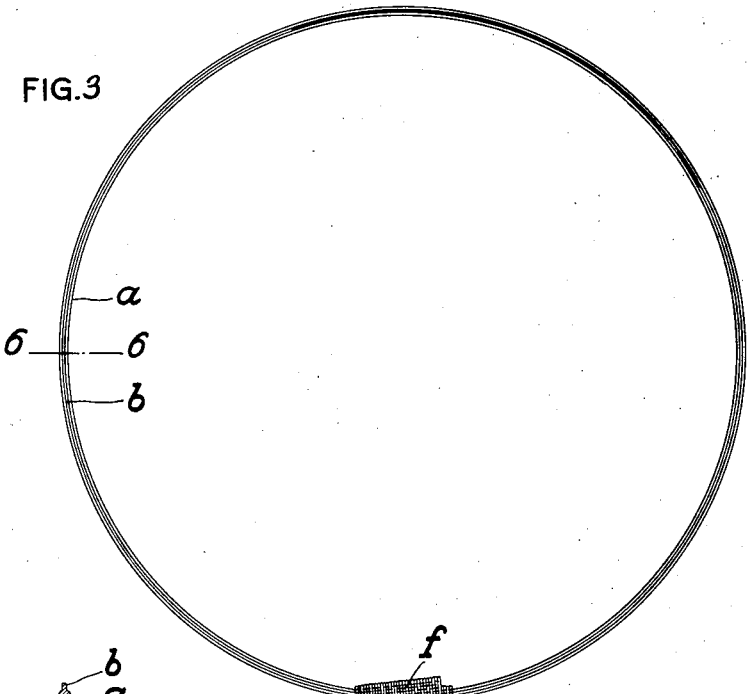
Fig. 3 shows in top plan view a wreath hoop made of the wire illustrated in Figs. 1 and 2.
Figure 4:
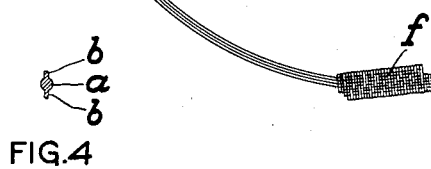
Fig. 4 is a cross section on line A—B of Fig. 3.

The wreath hoop illustrated in Figs. 3 and 4 is bent from the wreath hoop wire showing in Figs. 1 and 2 in such a manner that the ribs $b$ projecting on two diametrically opposite sides of the wire are directed perpendicularly to the diameter of the wreath hoop. Thus, the fixing of the bunches of flowers or leaves on the wire hoop provided with the so-called wreath pad is considerably facilitated, as the ribs, owing to their position, offer no hindrance for the passage through the pad of the end of the piece of binding wire holding the flower or leaf bunch. The ends of the wreath hoop are interconnected in the usual manner by means of a piece of binding wire $f$.

I claim:—

1. A wire for forming hoops for plant wreaths, consisting of a wire core and continuous projections extending along said core adapted to prevent the plants from slipping and shifting on the wire.

2. A wire for forming hoops for plant wreaths, consisting of a rolled wire core with integrally formed continuous ribs extending along opposite sides of said core adapted to prevent the plants from slipping and shifting on the wire.

3. A hoop for plant wreaths formed by a rolled wire having a core and continuous ribs extending along opposite sides of said core in a direction substantially perpendicular to the plane of the hoop.

CARL KRAUSEN.